United States Patent
Newby et al.

(10) Patent No.: US 10,145,557 B2
(45) Date of Patent: *Dec. 4, 2018

(54) DIFFUSE COMBUSTION METHOD AND APPARATUS

(71) Applicant: Fives North American Combustion, Inc., Cleveland, OH (US)

(72) Inventors: John N. Newby, Newburgh Hts., OH (US); Thomas F. Robertson, Medina Township, OH (US); Bruce E. Cain, Akron, OH (US)

(73) Assignee: Fives North American Combustion, Inc., Cleveland, OH (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/195,244

(22) Filed: Jun. 28, 2016

(65) Prior Publication Data
US 2016/0305661 A1 Oct. 20, 2016

Related U.S. Application Data

(62) Division of application No. 13/798,303, filed on Mar. 13, 2013, now Pat. No. 9,476,589.

(51) Int. Cl.
*F23N 1/02* (2006.01)
*F23N 5/26* (2006.01)
*F23C 99/00* (2006.01)

(52) U.S. Cl.
CPC ............. *F23N 1/022* (2013.01); *F23C 99/00* (2013.01); *F23N 5/26* (2013.01); *F23C 2900/99001* (2013.01); *F23C 2900/99006* (2013.01); *Y02E 20/342* (2013.01)

(58) Field of Classification Search
CPC ........................................................ F23N 5/26
USPC ...... 60/746, 747, 751, 804; 431/2, 4, 5, 6, 8, 431/11, 12, 115, 116, 202
See application file for complete search history.

(56) References Cited

U.S. PATENT DOCUMENTS

| | | | |
|---|---|---|---|
| 6,221,127 B1* | 4/2001 | Rierson | C21B 13/08 75/477 |
| 2004/0063054 A1* | 4/2004 | Cain | F23N 5/242 431/12 |
| 2007/0006681 A1* | 1/2007 | Robertson | C22B 21/0084 75/671 |
| 2008/0081301 A1* | 4/2008 | Hannum | F23N 1/022 431/12 |

* cited by examiner

*Primary Examiner* — Avinash Savani
*Assistant Examiner* — Rabeeul Zuberi
(74) *Attorney, Agent, or Firm* — Benesch, Friedlander, Coplan & Aronoff LLP

(57) ABSTRACT

A method supplies reactants, including fuel gas, to burners that discharge the reactants into a furnace process chamber. In a stable flame mode of operation, stable flames are projected from the burners into the furnace process chamber. At a time when the furnace process chamber has a temperature at or above an autoignition temperature of the fuel gas, a diffuse combustion mode is initiated by supplying a selected burner with additional reactants, including reactants diverted from another burner, to blow off the stable flame at the selected burner.

16 Claims, 7 Drawing Sheets

DIFFUSE COMBUSTION METHOD AND APPARATUS

RELATED APPLICATIONS

This application is a divisional of U.S. patent application Ser. No. 13/798,303, filed Mar. 13, 2013, which is incorporated by reference.

TECHNICAL FIELD

This invention relates to a furnace combustion system.

SUMMARY

A method supplies reactants, including fuel gas, to burners that discharge the reactants into a furnace process chamber. In a stable flame mode of operation, stable flames are projected from the burners into the furnace process chamber. At a time when the furnace process chamber has a temperature at or above an autoignition temperature of the fuel gas, a diffuse combustion mode is initiated be supplying a selected burner with additional reactants, including reactants diverted from another burner, to blow off the stable flame at the selected burner. In the present context, "diffuse combustion" is thus intended to mean "flameless combustion."

The additional reactants preferably consist of diverted reactants, and are preferably diverted from more than one of the other burners. The initiating step may turn off or turn down any one or more of the burners from which reactants are diverted to the selected burner, and preferably does not reduce a total rate at which reactants are supplied to the burners.

Another preferred feature is the subsequent step of diverting reactants from the selected burner to provide it with reactants at a reduced rate at which a stable flame reignites at the autoignition temperature. This is preferably accomplished by diverting reactants from the selected burner to one or more of the other burners, and without reducing a total rate at which reactants are supplied to the burners.

An apparatus includes burners that discharge reactants into a furnace process chamber, and a reactant supply and control system that supplies reactants, including fuel gas, to the burners. The reactant supply and control system includes a controller configured to supply the burners with reactants that project a stable flame into the process chamber. The controller is further configured to detect an elevated process chamber temperature that is at or above an autoignition temperature of the fuel gas and, upon detecting the elevated process chamber temperature, to initiate diffuse combustion by supplying a selected burner with additional reactants, including reactants diverted from another burner, to blow off the stable flame at the selected burner.

The controller can be further configured to subsequently divert reactants from the selected burner to one or more of the other burners to provide the selected burner with reactants at a reduced rate at which a stable flame reignites at the autoignition temperature.

Preferably, the controller is configured to divert reactants between the burners, either to blow off or reignite a stable flame, without reducing a total rate at which reactants are supplied to the burners.

BACKGROUND

A furnace may provide heat by burning fuel gas in a combustible mixture with oxidant gas. Such a furnace includes one or more burners, and has a reactant supply system with lines and valves that direct streams of the fuel and oxidant gases to the burners. In some furnaces the fuel and oxidant gases are provided to the burners in separate streams that form combustible mixtures within the burners. In other furnaces the fuel and oxidant gases are provided to the burners in a combustible mixture known as premix. In each case, the furnace has a control system that controls the reactant supply system so that combustion of the fuel will occur in a manner appropriate for the heating process to be performed by the furnace. The control system includes instruments such as temperature sensors, igniters, and flame detectors, and controls the valves in the reactant supply system with reference to combustion parameters indicated by those instruments.

Figure 1:
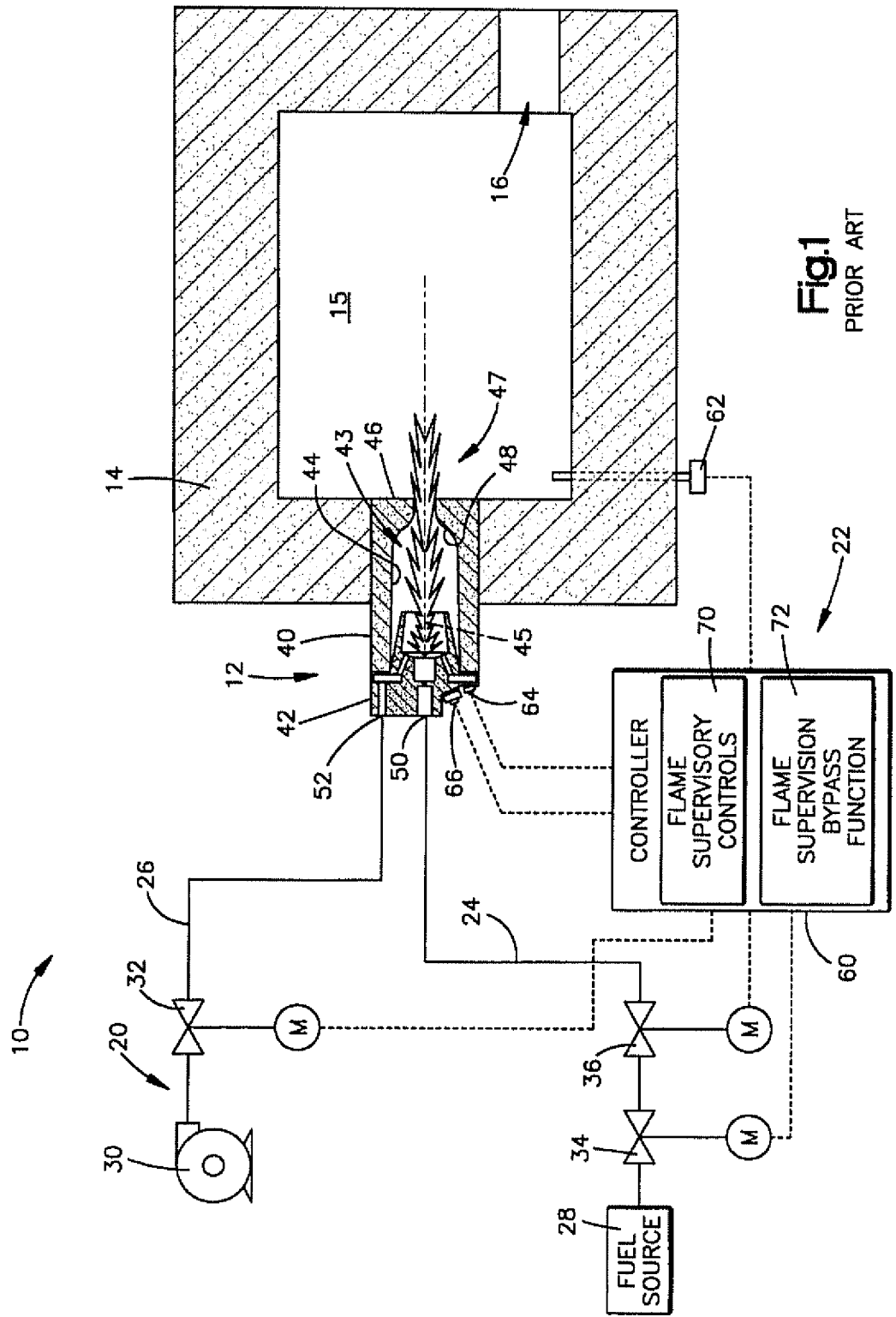
FIG. 1 is a schematic view of a furnace apparatus that is known in the prior art.
Figure 2:
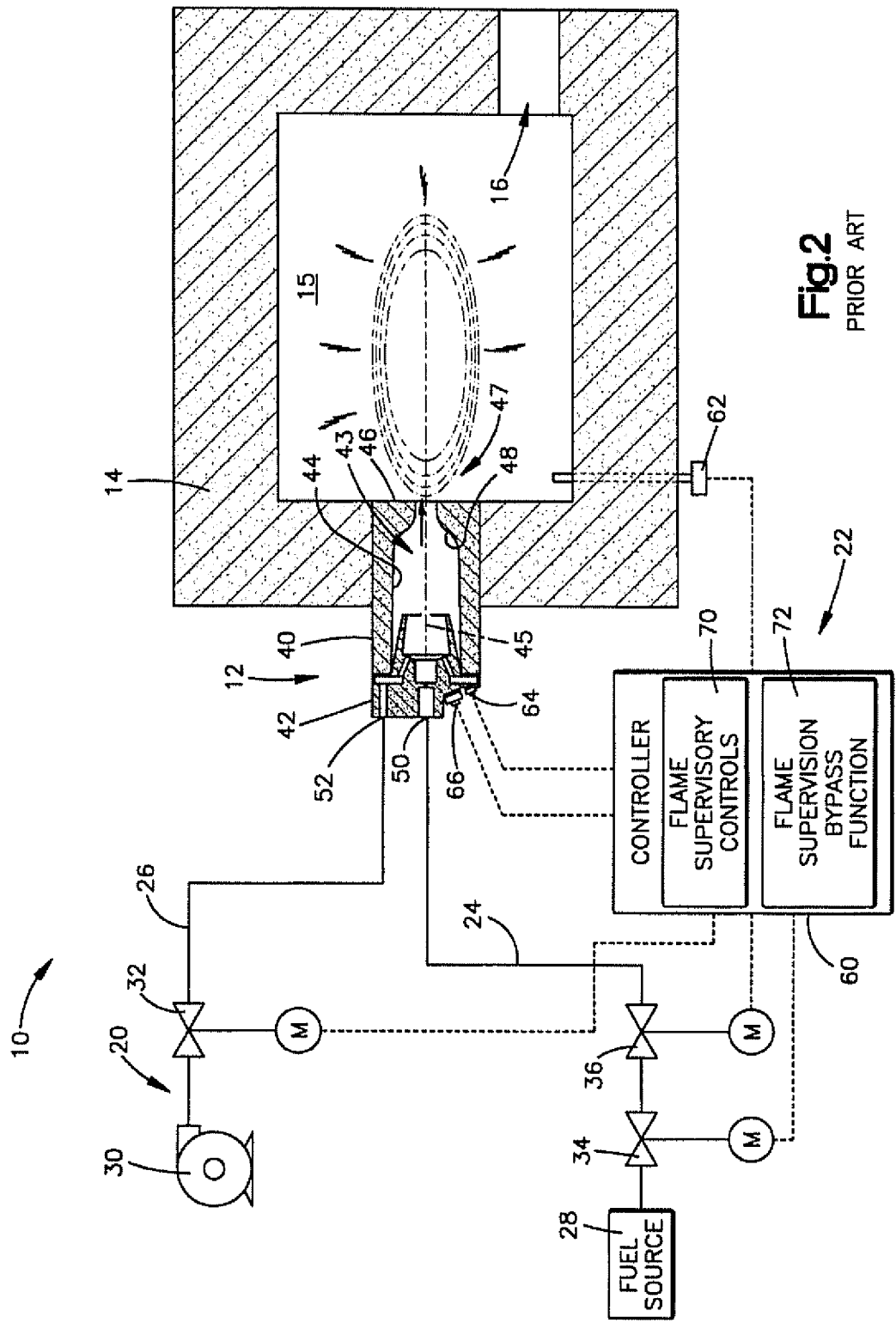
FIG. 2 is a schematic view showing the apparatus of FIG. 1 in a diffuse combustion mode of operation.

Parts of a known furnace apparatus 10 are shown schematically in FIGS. 1 and 2. These include a burner assembly 12 mounted in a furnace wall structure 14. The wall structure 14 defines a combustion chamber 15, which may be referred to as a process chamber, with a flue gas outlet 16. A reactant supply system 20 provides reactants to the burner assembly 12 under the direction of a control system 22. This enables the burner assembly 12 to provide a controlled amount of heat for a heating process to be carried out in the combustion chamber 15.

The reactant supply system 20 includes fuel and oxidant supply lines 24 and 26 that convey fuel and oxidant from respective sources 28 and 30 to the burner assembly 12. The oxidant is typically the oxygen in a stream of air, and the fuel is typically natural gas. A motorized oxidant valve 32 controls the stream of air in the oxidant supply line 26. A pair of motorized fuel valves 34 and 36 control the stream of fuel in the fuel supply line 24. The oxidant valve 32 and the first fuel valve 34 are modulating valves. The second fuel valve 36 is a shut-off valve. Each valve motor is operated by the control system 22 to open, shift, and close the respective valve 32, 34 or 36 as directed by the control system 22.

The burner assembly 12 has two major portions 40 and 42 that are shown schematically in FIG. 1. The first portion 40 is a burner tile with an internal reaction zone 43. A generally cylindrical inner surface 44 of the burner tile 40 is centered on an axis 45, and defines the peripheral boundaries of the reaction zone 43. An outer end surface 46 of the burner tile 40 defines an outlet 47 that communicates the reaction zone 43 with the combustion chamber 15. The outlet 47 is circular and also is centered on the axis 45. An end portion 48 of the inner surface 44 is tapered radially inward so that the outlet 47 is constricted relative to the generally 10 cylindrical configuration of the reaction zone 43.

The second major portion 42 of the burner assembly 12 comprises a burner with a fuel inlet 50 and an oxidant inlet 52. Passages within the burner 42 receive the streams of fuel and oxidant from the inlets 50 and 52 to form a combustible mixture, and the burner 42 is oriented to fire a flame into the reaction zone 43 in a direction extending into the combustion chamber 15 through the outlet 47.

The control system 22 includes a controller 60. The control system 22 further includes a temperature sensor 62 which is operative in the combustion chamber 15. Additional parts of the control system 22 that are shown schematically in FIG. 1 include an igniter 64 and a flame detector 66. These are conventional devices that are operatively mounted in the burner assembly 12 in a known manner.

Other parts of the burner assembly 12, the furnace wall structure 14, the reactant supply system 20 and the control system 22 are known to a person of ordinary skill in the art. Those parts, such as a flame stabilizer within the burner assembly 12, are omitted from the drawings for clarity of the schematic illustrations.

As indicated in FIG. 1, the controller 60 includes flame supervisory controls in the form of hardware and/or software 70 for operating the furnace apparatus 10 with flame supervision, and further has a flame supervision bypass function, including hardware and/or software 72 for bypassing flame supervision. As the controller 60 carries out those instructions, it actuates the blower 30 and the valves 32, 34 and 36 to provide streams of fuel and oxidant along the supply lines 24 and 26, and actuates the igniter 64 to initiate combustion of those reactants in a flame that projects from the burner 42.

As the streams of fuel and oxidant continue to flow to the burner 42, the controller 60 provides flame supervision in accordance with the corresponding flame supervisory controls 70. Flame supervision is one of several supervisory functions the controller 60 performs by monitoring sensors that can indicate system malfunctions. Such sensors are known in the art and are omitted from the drawings for clarity of illustration.

If a malfunction occurs, the controller 60 can respond by closing the shut-off valve 36 as a safety precaution. If a malfunction does not present an unsafe condition, the controller 60 can bypass the supervisory function for the corresponding sensor, and can allow combustion to continue. The controller 60 thus monitors the flame detector 66 in readiness to close the shut-off valve 36 if the flame detector 66 indicates the absence of a flame. This would occur if the flame were inadvertently extinguished by a system malfunction. However, the controller 60 monitors the temperature sensor 62 also, and is operative to compare the sensed combustion chamber temperature to a predetermined auto-ignition temperature of the fuel supplied to the burner 42. If the sensed combustion chamber temperature is not less than the auto-ignition temperature, and if the flame supervision bypass function 72 is enabled, the flame supervisory controls 70 are bypassed. With the flame supervisory controls 70 bypassed, indication by the flame detector 66 of the absence of a flame projecting from the burner 42 will not result in the controller 60 closing the shut-off valve 36. Rather, the controller 60 then holds the shut-off valve 36 open so that the fuel can continue to flow through the burner 42 and onward through the reaction zone 43 to enter the combustion chamber 15 through the outlet 47. This results in diffuse combustion of the fuel upon auto-ignition in the combustion chamber 15 in the absence of a flame at the burner 42, as shown in FIG. 2.

Figure 3:
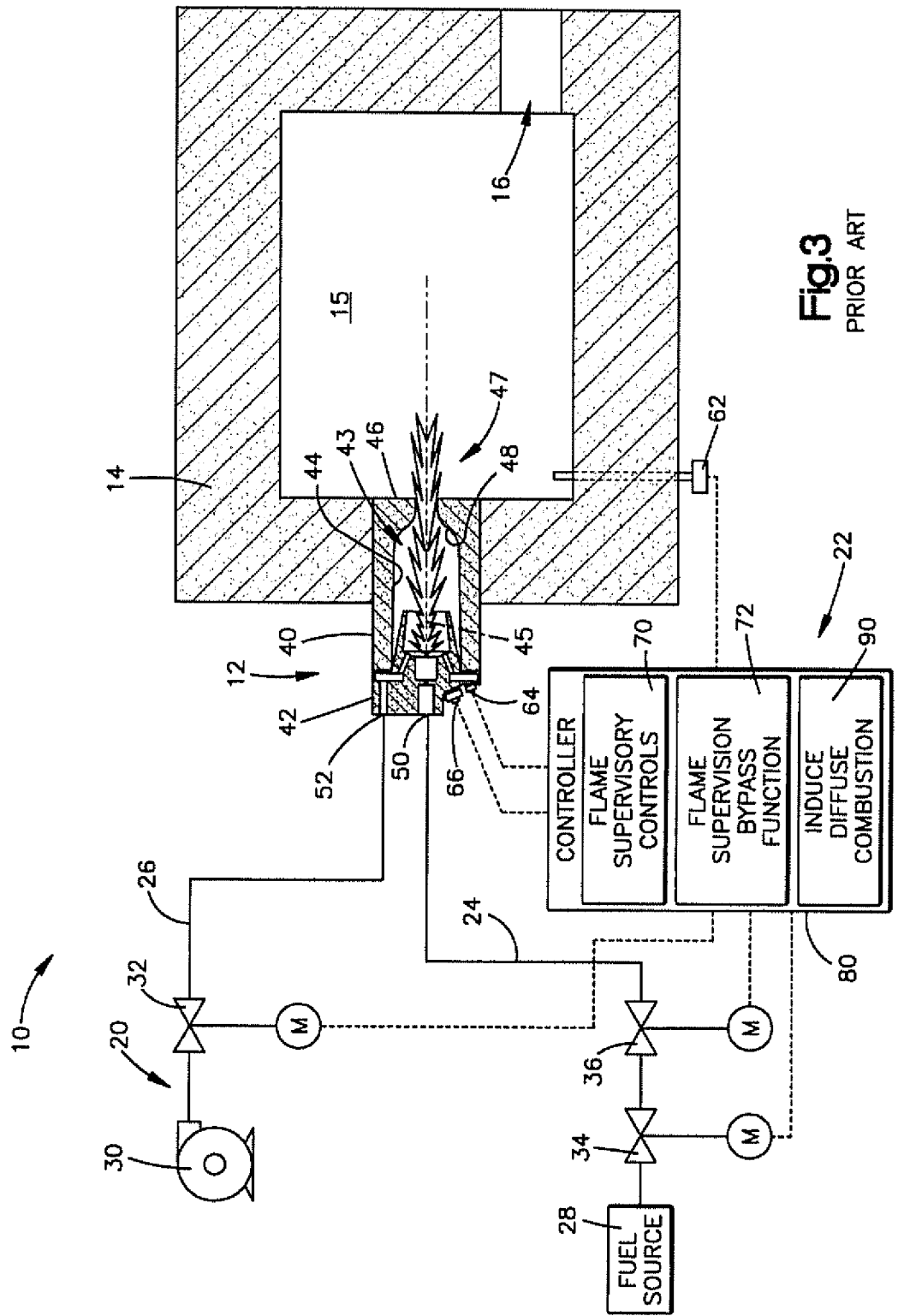
FIG. 3 is a schematic view of another furnace apparatus that is know in the prior art.
Figure 4:
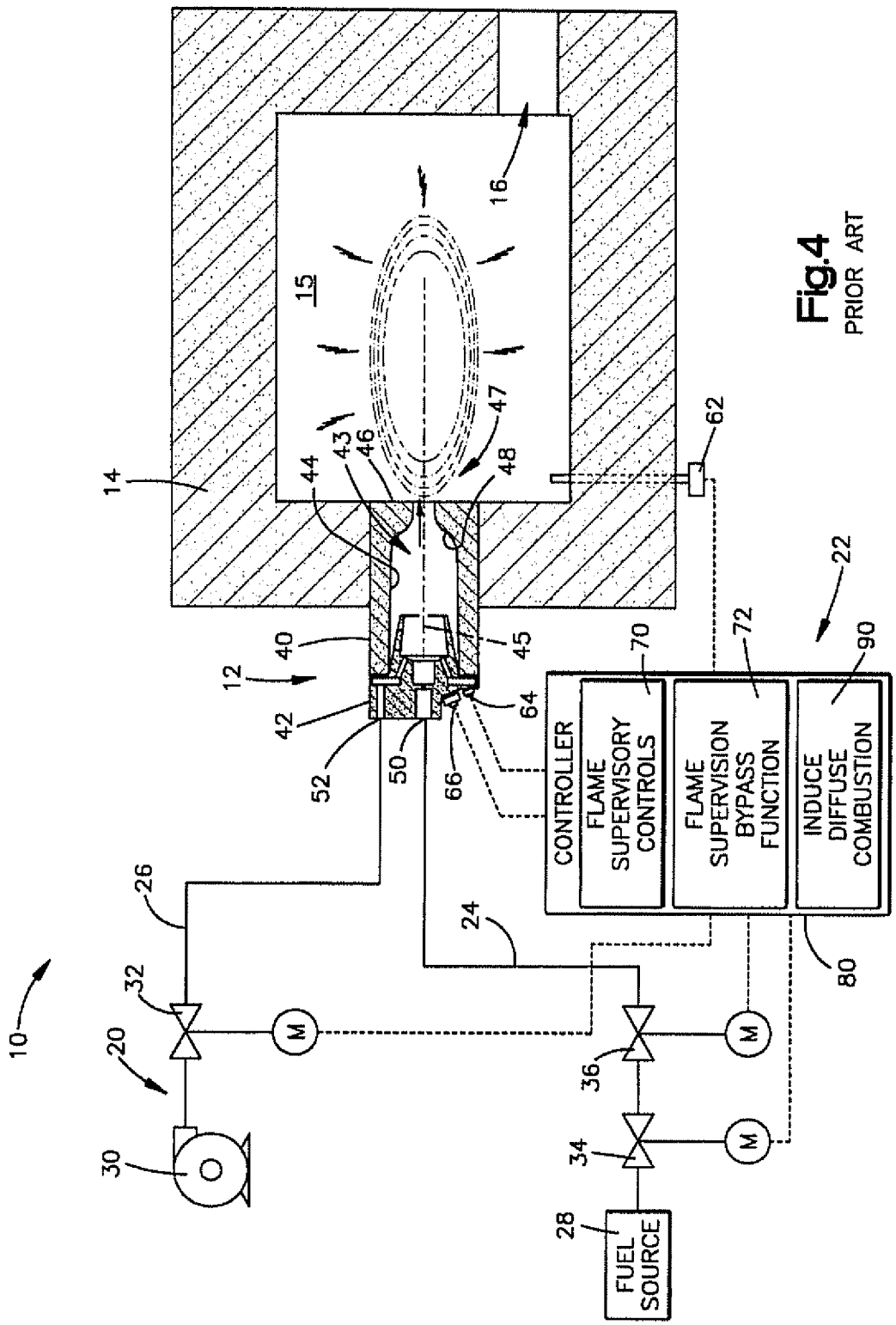
FIG. 4 is a schematic view showing the apparatus of FIG. 3 in a diffuse combustion mode of operation.

As shown in FIGS. 3 and 4, the furnace apparatus 10 can be modified by providing a controller 80 with additional control functions 90 for initiating diffuse combustion in a controlled manner, i.e. for inducing diffuse combustion. The controller 80 of FIGS. 3 and 4 can be a modification of the prior art controller 60 described above, or a replacement for the prior art controller 60.

This controller 80 also commences combustion of the reactants with a flame at the burner 42, as shown in FIG. 3. However, unlike the prior art controller 60, the controller 80 can induce a diffuse mode of combustion. The additional control functions 90 can direct the controller 80 to induce diffuse combustion either automatically without intervention by an operator of the modified apparatus 10, or only if the operator provides corresponding actuating input. The additional control functions 90 could direct the controller 80 to receive the actuating input either before, during, or after the flame is ignited.

If diffuse combustion is to be induced, the controller 80 compares the sensed combustion chamber temperature with the predetermined auto-ignition temperature of the fuel to determine if the sensed temperature is below the auto-ignition temperature. This is preferably accomplished by comparing the combustion chamber temperature to a specified bypass setpoint temperature that is predetermined to be above the auto-ignition temperature of the fuel. If the combustion chamber temperature is less than the specified temperature, and if the flame detector 66 then indicates the absence of a flame at the burner 42, the controller 80 closes the shut-off valve 36. On the other hand, if the flame detector 66 indicates the continued presence of the flame, the controller 80 continues to monitor the sensed combustion chamber temperature with reference to the specified temperature. When the sensed combustion chamber temperature increases from a level below the specified temperature to a level at or above the specified temperature, the controller 80 responds by enabling the flame supervision bypass function 72 so that absence of a flame at the burner 42 will not result in closing of the shut-off valve 36. The controller 80 then begins to execute the diffuse combustion function 90, closing the shut-off valve 36. This extinguishes the flame at the burner 42.

The controller 80 continues to monitor the sensed combustion chamber temperature during a short delay, such as about five seconds, after closing the shut-off valve 36. This ensures that the flame has been fully extinguished, which can be confirmed by the flame detector 66. If the sensed combustion chamber temperature drops below the specified temperature during the delay, the shut-off valve 36 will remain closed until the process is restarted. However, if the sensed combustion chamber temperature remains at or above the specified temperature, as it was when the shut-off valve 36 was closed, the controller 80 will reopen the shut-off valve 36. The fuel stream will then flow once again through the burner 42 and onward through the reaction zone 43 to enter the combustion chamber 15 through the outlet 47. Although the igniter 64 is ordinarily actuated if the shut-off valve 36 is opened from a closed condition, it is not actuated in response to reopening of the shut-off valve 36 in this manner. Auto-ignition of the fuel then occurs in the combustion chamber 15 to provide diffuse combustion in the absence of a flame at the burner 42, as shown in FIG. 4. The controller 80 continues to monitor the sensed combustion chamber temperature during furnace operation in the diffuse combustion mode, and will close the shut-off valve 36 if the temperature falls below the specified temperature.

Figure 5:
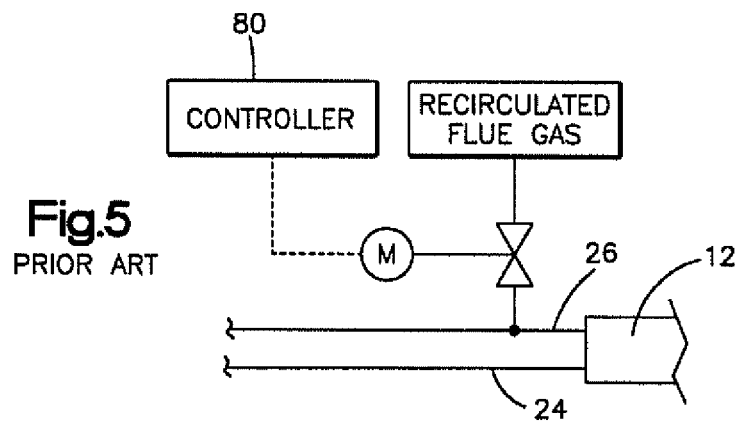
FIG. 5 is a partial view of a modification of the apparatus shown in FIGS. 3 and 4.
Figure 6:
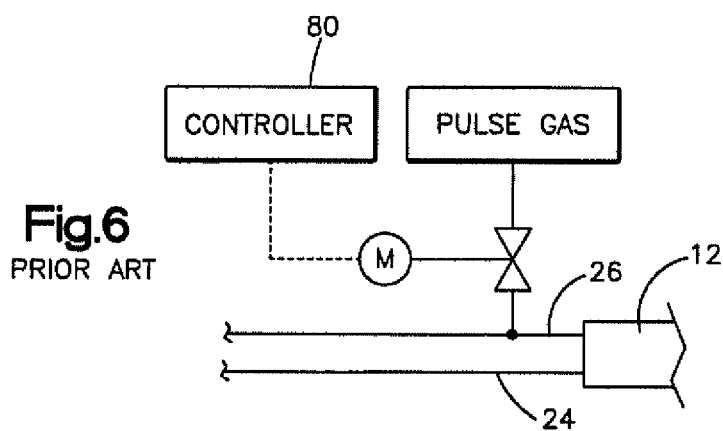
FIG. 6 also is a partial view of a modification of the apparatus shown in FIGS. 3 and 4.

As described above, the flame is extinguished by closing the shut-off valve 36. Instead, the flame could be extinguished by operating the modulating valves 32 and 34, and/or the blower 30, so as to cause the reactant supply system 20 to provide the reactants to the burner assembly 12 in a fuel to oxidant ratio that does not sustain the flame at the burner 42. This could be accomplished by interrupting, decreasing or increasing the flow of oxidant to the burner 42 while maintaining the flow of fuel. Recirculated flue gas (FIG. 5) also could be introduced in the burner assembly 12 to extinguish the flame by diluting the fuel to oxidant ratio in a similar manner. The reactant supply system 20 can further be provided with a source of compressed air (FIG. 6), or an inert gas such as nitrogen, for creating a pulse which would extinguish the flame. Once the flame has been extinguished, the relatively lesser flow area provided by the restricted configuration of the reaction zone outlet 47 imparts correspondingly greater velocities to the reactants flowing through the reaction zone 43 and into the combustion chamber 15, and thus helps to ensure that the flame will not reignite.

EMBODIMENTS OF THE INVENTION

Figure 7:
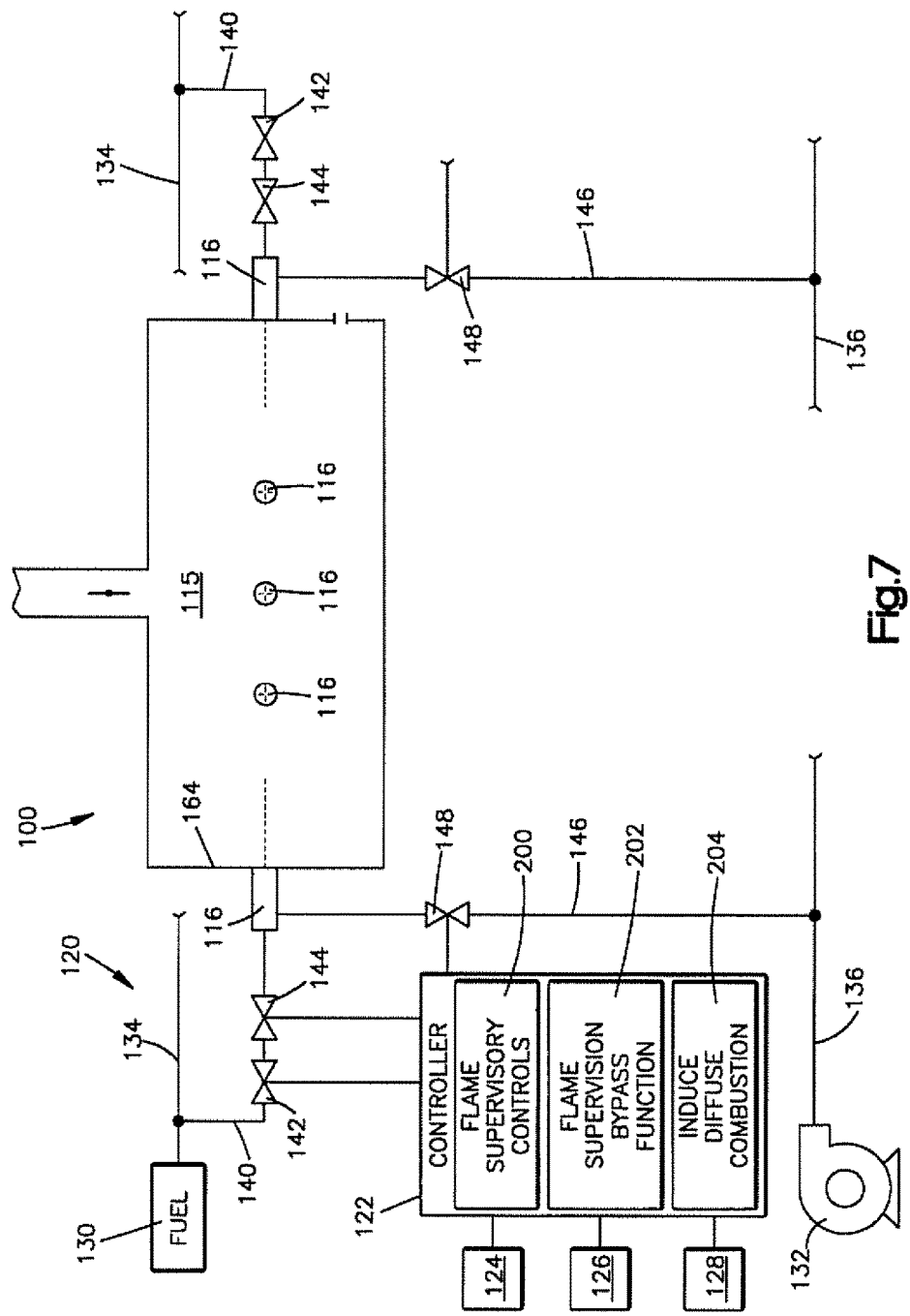
FIG. 7 is a schematic view of a furnace apparatus according to the invention.
Figure 8:
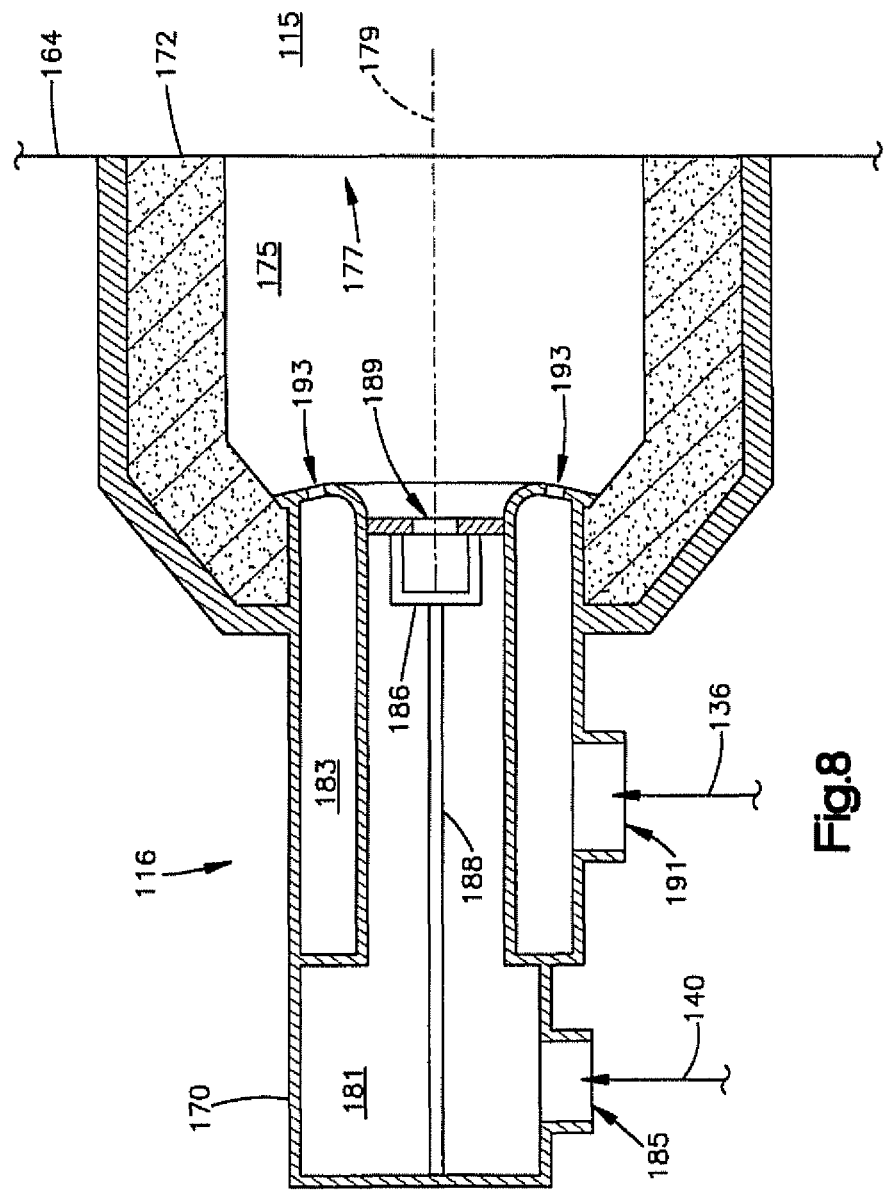
FIG. 8 is an enlarged view of a burner in the furnace apparatus of FIG. 7.

The structure 100 shown schematically in the FIGS. 7 and 8 can be operated in steps that are examples of the elements recited in the method claims, and has parts that are examples of the elements recited in the apparatus claims. The illustrated structure 100 thus includes examples of how a person of ordinary skill in the art can make and use the claimed invention. It is described here to meet the enablement and best mode requirements of the patent statute without imposing limitations that are not recited in the claims.

This particular apparatus 100 is a furnace with a process chamber 115 for receiving a load to be heated. The furnace 100 has burners 116 that are fired into the process chamber 115. The furnace 100 also has a reactant supply and control system 120 that includes a controller 122. The reactant supply and control system 120 further includes one or more sensors 124 that sense temperature in the process chamber 115. Additional parts of the reactant supply and control system that are shown schematically in FIG. 1 include igniters 126 and flame detectors 128. These are conventional devices that are operatively associated with the burners 116 in a known manner.

In operation, the burners 116 are fired with reactant streams of fuel and oxidant under the influence of the controller 122. This provides heat for heating the load in a manner directed by the controller 122. The various parts of the furnace 100, as shown, described and claimed, may be of either original or retrofitted construction as required to accomplish any particular implementation of the invention.

A fuel source 130, which is preferably a supply of natural gas, and an oxidant source 132, which is preferably an air blower, provide streams of those reactants along respective supply lines 134 and 136 in the reactant supply and control system 120. Each burner 116 communicates with the fuel supply line 134 through a branch line 140 with a pair of fuel control valves 142 and 144. The first fuel control valve 142 is a modulating valve. The second fuel control valve 144 is a shut-off valve. Each burner 116 also communicates with the oxidant supply line 136 through a branch line 146 with an oxidant control valve 148.

The process chamber 115 may have any suitable configuration, but for clarity of illustration the process chamber 115 shown schematically in the drawings has a circular configuration with a cylindrical side wall 164. The burners 116 are mounted on a side wall 164 of the process chamber 115 in an array extending circumferentially around the side wall 164.

Each burner 116 in the illustrated embodiment preferably has the structure shown in FIG. 8. This includes a body structure 170 and a burner tile 172. The burner tile 172 is formed of a refractory material, and defines a reaction zone 175 with an outlet 177 to the process chamber 115. The reaction zone 175 has a generally cylindrical configuration centered on an axis 179. Unlike the reaction zone outlet 47 in the burner tile 40 described above, the reaction zone outlet 177 in the burner tile 172 of FIG. 8 is not constricted relative to the generally cylindrical configuration of the respective reaction zone 175.

The body structure 170 of the burner 116 defines a fuel plenum 181 and an oxidant plenum 183. An inlet 185 to the fuel plenum 181 is connected to receive fuel gas from an associated branch line 140 in the reactant supply and control system 120. A flame stabilizing structure, which in this example is a gas disc 186 on a support rod assembly 188, is located within the fuel plenum 181 beside a nozzle port 189 from the fuel plenum 181 to the reaction zone 175. The nozzle port 189 is oriented to discharge fuel gas into the reaction zone 175 as a jet centered on the axis 179.

An inlet 191 to the oxidant plenum 183 is connected to receive combustion air from an associated branch line 136 in the reactant supply and control system 120. Outlet ports 193 from oxidant plenum 173 are arranged in a circular array centered on the axis 179, and are inclined to discharge streams of combustion air into the reaction zone 175 in radially outward directions.

The controller 122 is operatively associated with the reactant supply system 120, including the blower 132, the fuel control valves 142 and 144, the oxidant control valves 148, the temperature sensors 124, the igniters 126 and the flame detectors 128, and has hardware and/or software configured for operation of the burners 116. As the controller 122 carries out those instructions, it actuates the blower 132 and the various valves to initiate, regulate and terminate flows of reactant streams that cause the burners 116 to fire into the process chamber 115 in a controlled manner. The controller 122 shown schematically in the drawings may thus comprise any suitable programmable logic controller or other control device, or combination of control devices, that is programmed or otherwise configured to perform as described and claimed. If the furnace 100 is retrofitted, the claimed controller could be provided by replacing, supplementing and/or adapting an existing controller.

More specifically, the controller 122 is configured with flame supervisory controls in the form of hardware and/or software 200 for operation of the burners 116 with flame supervision, and further has a flame supervision bypass function, including hardware and/or software 202 for bypassing flame supervision, as described above with reference to the control functions 70 and 72 of the prior art controller 60. The controller 122 is further configured with additional hardware and/or software 204 for controlling diffuse combustion. These additional control functions 204 differ from the diffuse combustion control functions 90 of the prior art controller 60 described above.

The additional control functions 204 relate to operation of a burner 116 in a stable flame mode and, alternatively, in a diffuse combustion mode. Each burner 116 has a limit of the fuel and combustion air supply, e.g. a maximum firing rate or maximum flow rate, above which it cannot support a stable flame. This may be referred to as the tile-stable limit of the burner 116. In a stable flame mode of operation, the controller 122 supplies a burner 116 with fuel and combustion air at a rate that does not exceed the tile-stable limit. This provides the burner 116 with a stable flame that projects along the axis 179 toward and outward through the reaction zone outlet 177 and into the furnace process chamber 115.

When the temperature sensors 124 indicate a process chamber temperature that is at or above the autoignition temperature of the fuel gas, the additional control functions 204 of the controller 122 can increase the reactant supply rate at a burner 116 to a level above the tile-stable limit. This will blow off the stable flame at the burner 116. Under the flame supervision bypass functions 202 of the controller 122, the burner 116 will continue to receive streams of fuel and combustion air without interruption when the flame has been blown off. As those reactants are discharged from the burner 116 into the process chamber 115 at a rate above the tile-stable limit, the autoignition temperature in the process chamber 115 will cause the fuel to autoignite in a diffuse mode in the absence of a flame at the burner 116. This can reduce the production of NOx at the burner 116.

If the process chamber temperature remains at or above the autoignition temperature, the controller 122 can also switch the burner 116 back from the diffuse combustion mode to the stable flame mode without interrupting the flow of reactants through the burner 116 into the process chamber 115. While the controller 122 continues the uninterrupted supply of reactants to the burner 116 under the flame supervision bypass functions 202, the diffuse combustion control functions 204 can decrease the reactant supply rate at the burner 116 to a level at or below the tile-stable limit. The stable flame will then reignite at autoignition temperature. As noted above, the reaction zone outlet 177 is free of a constriction that would prevent the flame from reigniting.

When increasing a reactant supply rate to switch a burner 116 into the diffuse combustion mode, or when decreasing a reactant supply rate to switch a burner 116 back to the stable flame mode, the controller 122 preferably changes a reactant supply rate only by diverting the reactant supply from one or more of the burners 116 to one or more of the other burners 116. This enable the controller 122 to switch modes among the burners 116, and also to modulate the reactant supply rates at the burners 116 in both the stable flame mode and the diffuse combustion mode, while maintaining a constant or substantially constant total rate of reactant discharge from the burners 116 into the process chamber 115. The controller 122 can thus use the differing modes of operation to reduce the production of NOx without reducing the heat input to the process chamber 115.

For example, an embodiment of the furnace 100 may have ten burners, each of which has a nominal firing rate capacity of 1 MM Btu/h for a total of 10 MM Btu/h heat input to the process chamber, and a tile-stable limit of 1.2 MM Btu/h, with a minimum system controlled firing rate requirement of 2 MM Btu/h (5:1 turndown). Such a furnace can be operated in several diffuse combustion modes, including the following proposed examples.

In a first example, all ten burners are fired into the process chamber in a stable flame mode with a firing rate of 1 MM Btu/h for a total firing rate of 10 MM Btu/h. At a time when the process chamber has a temperature at or above the auto ignition temperature of the fuel, which is typically 1450 degrees F., five of the ten burners are shut off and their fuel and combustion air are diverted equally to the other five burners. The diverted reactants double the firing rate at each of those other five burners from 1 MM Btu/h to 2 MM Btu/h. As the firing rates surpass the tile-stable limit of 1.2 MM Btu/h, the stable flames are blown off, and diffuse combustion is thus induced at those burners. Continued operation of five burners at 2 MM Btu/h each maintains the original heat input of 10 MM Btu/h to the process chamber while producing less NOx in the diffuse combustion mode.

In other examples, the reactants could be diverted unequally among the burners, and one or more of the burners from which reactants are diverted could be turned down instead of being turned off. Such a burner could continue firing in the stable flame mode at a firing rate below its tile-stable limit. Multiple burners could continue firing at or below their tile-stable limit when reactants are diverted as needed to supply the remaining balance of reactants to burners in the diffuse combustion mode. Although the given examples are expressed in terms of firing rates, similar examples could be expressed in terms of reactant flow rates. In each case, the controller 122 can be configured to switch one or more burners back and forth between the stable flame and diffuse combustion modes either automatically in response to predetermined conditions without intervention by an operator, or under the direction of an operator.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that occur to those skilled in the art. Such other examples, which may be available either before or after the application filing date, are intended to be within the scope of the claims if they have structural or process elements that do not differ from the literal language of the claims, or if they have equivalent structural or process elements with insubstantial difference from the literal language of the claims.

What is claimed is:

1. An apparatus comprising:
   burners that include flame stabilizing structures and are configured to discharge reactants into a furnace process chamber; and
   a reactant supply and control system that supplies the reactants, including fuel gas and combustion air, to the burners;
   wherein the reactant supply and control system includes a controller configured to supply the burners with the reactants at rates to project stable flames into the process chamber; and
   wherein the controller is further configured to detect an elevated process chamber temperature that is at or above an autoignition temperature of the fuel gas and, upon detecting the elevated process chamber temperature, to initiate flameless combustion in the process chamber by supplying a selected one of the burners with additional reactants, including reactants diverted from another of the burners, to blow off the stable flame at the selected burner.

2. An apparatus as defined in claim 1 wherein the controller is configured for the additional reactants to include reactants diverted from more than one of the burners.

3. An apparatus as defined in claim 1 wherein the controller is configured for the additional reactants to consist of reactants diverted from one or more of the burners.

4. An apparatus as defined in claim 1 wherein the controller is configured to turn off one or more of the burners by diverting reactants to the selected burner.

5. An apparatus as defined in claim 1 wherein the controller is configured to turn down one or more of the burners by diverting reactants to the selected burner.

6. An apparatus as defined in claim 1 wherein the controller is configured to divert reactants to the selected burner without reducing a total rate at which reactants are supplied to the burners.

7. An apparatus as defined in claim 1 wherein the controller is configured to subsequently divert reactants from the selected burner to provide the selected burner with reactants at a reduced rate at which a stable flame reignites at the autoignition temperature.

8. An apparatus as defined in claim 7 wherein the controller is configured to provide the selected burner with reactants at the reduced rate by diverting reactants from the selected burner to one or more of the burners other than the selected burner without reducing a total rate at which reactants are supplied to the burners.

9. An apparatus comprising:
burners that include flame stabilizing structures and are configured to discharge reactants into a furnace process chamber; and
a reactant supply and control system that supplies the burners with the reactants, including fuel gas and combustion air;
wherein the reactant supply and control system includes a controller configured to supply the burners with the reactants at rates that support stable flames at the burners; and
wherein the controller is further configured to, at a time when the furnace process chamber has a temperature at or above autoignition temperature of the fuel gas, divert reactants from one or more of the burners to one or more of the burners other than the burners from which reactants are diverted, and thereby to initiate flameless combustion in the process chamber by blowing off the stable flame at one or more of the burners to which reactants are diverted, without reducing a total rate at which the reactants are supplied to the burners.

10. An apparatus as defined in claim 9 wherein the controller is configured to blow off the stable flame at each burner to which reactants are diverted.

11. An apparatus as defined in claim 9 wherein the controller is configured to turn off one or more of the burners by diverting reactants to the selected burner.

12. An apparatus as defined in claim 9 wherein the controller is configured to turn down one or more of the burners by diverting reactants to the selected burner.

13. An apparatus as defined in claim 9 wherein the controller is configured to subsequently divert reactants from a burner at which the stable flame has been blown off and thereby to provide the burner with reactants at a reduced rate at which a stable flame reignites at the autoignition temperature.

14. An apparatus as defined in claim 13 wherein the controller is configured to provide the burner with reactants at the reduced rate without reducing a total rate at which reactants are supplied to the burners.

15. An apparatus comprising:
burners that include flame stabilizing structures and are configured to discharge reactants into a furnace process chamber;
a reactant supply and control system that supplies reactants, including fuel gas and combustion air, to the burners;
wherein the reactant supply and control system includes a controller configured to supply the burners with the reactants at flow rates that support stable flames at the burners;
wherein the controller is configured to blow off the stable flame at a selected one of the burners at a time when the furnace process chamber has a temperature at or above an autoignition temperature of the fuel gas and thereby to initiate flameless combustion in the furnace process chamber; and
wherein the controller is further configured to subsequently divert reactants from the selected burner to one or more of the burners other than the selected burner to provide the selected burner with reactants at a reduced rate at which a stable flame reignites at the autoignition temperature.

16. An apparatus as defined in claim 15 wherein the controller is configured to provide the selected burner with reactants at the reduced rate without reducing a total rate at which reactants are supplied to the burners.

* * * * *